(12) United States Patent
Matsuhashi et al.

(10) Patent No.: US 6,267,360 B1
(45) Date of Patent: Jul. 31, 2001

(54) SHOCK ABSORBER

(75) Inventors: Akira Matsuhashi; Yasushi Takagi, both of Tachikawa (JP)

(73) Assignee: Metrol Co., Ltd., Tokyo (JP)

( * ) Notice: Subject to any disclaimer, the term of this patent is extended or adjusted under 35 U.S.C. 154(b) by 0 days.

(21) Appl. No.: 09/548,627

(22) Filed: Apr. 13, 2000

(51) Int. Cl.[7] .................................................... F16F 5/00
(52) U.S. Cl. ........................................ 267/118; 267/114
(58) Field of Search ............................... 267/64.11, 114, 267/118, 119, 130; 72/350, 351; 91/444, 519; 92/146

(56) References Cited

U.S. PATENT DOCUMENTS

| 5,076,404 | * | 12/1991 | Gustafsson | ............................ | 267/114 |
| 5,100,113 | * | 3/1992 | Imanishi | ............................ | 267/119 |
| 5,353,683 | * | 10/1994 | Snitgen | ............................ | 91/519 |
| 5,435,530 | * | 7/1995 | Sand | ............................ | 267/114 |
| 5,588,641 | * | 12/1996 | Sand | ............................ | 267/114 |
| 5,623,848 | * | 4/1997 | Kirii | ............................ | 267/119 |

* cited by examiner

Primary Examiner—Christopher P. Schwartz
(74) Attorney, Agent, or Firm—Kanesaka & Takeuchi

(57) ABSTRACT

A shock absorber is formed of a cylinder having a stopping surface, a piston slidably situated in the cylinder to be moved when it is pushed by a moving member, and a switching device attached to the cylinder to be actuated right before the piston abuts against the stopping surface of the cylinder. An electromagnetic valve is connected to the switching device. The electromagnetic valve has a first position, and a second position for allowing air in the cylinder to escape outwardly when the piston is moved and the electromagnetic valve is operated by the switching device. A spring cooperates with the piston to return the piston to a position before the switching device is operated when a pressing force applied to the piston is removed by retreat of the moving member after the switching device is actuated.

13 Claims, 12 Drawing Sheets

SHOCK ABSORBER

BACKGROUND OF THE INVENTION AND RELATED ART STATEMENT

This invention relates to a shock absorber for absorbing a shock of a moving member, such as work, in case the moving member is transferred from a moving state to a stopping state.

A conventional shock absorber includes a cylinder, a bearing fixed to the cylinder such that a center of the bearing is located on a center line of the cylinder, and a piston moving in the cylinder and having a shaft. The piston slides along the bearing pushed by moving member. The shock absorber is structured such that when a forward end of the piston pushed by the moving member approaches an inner end of the cylinder, compressed oil is circulated to a back side of the piston through an orifice provided to, for example, the piston or cylinder, to thereby absorb a shock of the moving member.

Then, in case the moving member is retracted and the pressing force applied to the piston is removed, the piston is restored to an original position by a force of a restoring spring incorporated in the shock absorber or attached to an outside thereof.

In the above conventional shock absorber, as the forward end of the piston approaches the inner end of the cylinder, a reactive force of the restoring spring becomes strong in addition to a resistance force caused by compressed oil circulating in the orifice to thereby suddenly increase the whole reactive force. Therefore, the forward end of the piston pushed by the moving member may not reach a stopping surface of the cylinder, i.e. may not completely contact the stopping surface.

Further, a fatigue and creep relaxation occur to the restoring spring with the lapse of time, which results in a defective product.

Also, in the conventional shock absorber, in case there is required a signal to be outputted to a controlling device of the moving member when the forward end of the piston pushed by the moving member reaches the stopping surface of the cylinder, in other words, if the contact signal is required, a user has to provide a switching device for detecting a movement of the moving member or a movement of the piston shaft, separately.

In view of the above defects, the present invention has been made, and an object of the invention is to provide a shock absorber, wherein a restoring spring is omitted by restoring a piston by an air force without a signal from an outside, and at the same time, in order to allow the piston to firmly contact, when a forward end of the piston pressed by a moving member reaches an inner end of the cylinder, a compressed air in the inner portion of the cylinder is ejected.

Another object of the invention is to provide a shock absorber as stated above, wherein a contact signal indicating a contact of the piston to the inner end of the cylinder is outputted to a controlling circuit of the moving member.

Further objects and advantages of the invention will be apparent from the following description of the invention.

SUMMARY OF THE INVENTION

In order to attain the above objects, according to a first aspect of the invention, a shock absorber includes a cylinder, a bearing fixed to the cylinder and having a center line of the cylinder as a bearing center, and a piston having a shaft sliding along the bearing pushed by a moving member and moving in the cylinder. In the shock absorber, a switching device actuating right before the piston abuts against the stopping surface is formed at a stopping surface of the cylinder; compressed air in the cylinder is extracted or ejected by operating an electromagnetic valve through an actuation of the switching device; and when the moving member is retreated and a pressing force against the piston is removed, the piston is returned to a position before the switching device is operated by a spring with less stroke, so that the electromagnetic valve is restored or operated again to send air into the cylinder. Thus, the piston is restored to a state before the compression of the air is carried out.

According to a second aspect of the invention, in the shock absorber, there is outputted a contact signal, through actuation of the switching device, for indicating that the forward end of the piston pressed by the moving member contacts the stopping surface of the cylinder.

According to a third aspect of the invention, in the shock absorber, a speed controller is provided between the cylinder and the electromagnetic valve, wherein in case the piston compresses air in the cylinder, a first valve operates to control an air quantity discharged to an outside from an interior of the cylinder. Also, in case air is fed into the cylinder, a second valve operates to feed a large quantity of air quickly into the cylinder.

DETAILED DESCRIPTION OF PREFERRED EMBODIMENTS

Figure 1:
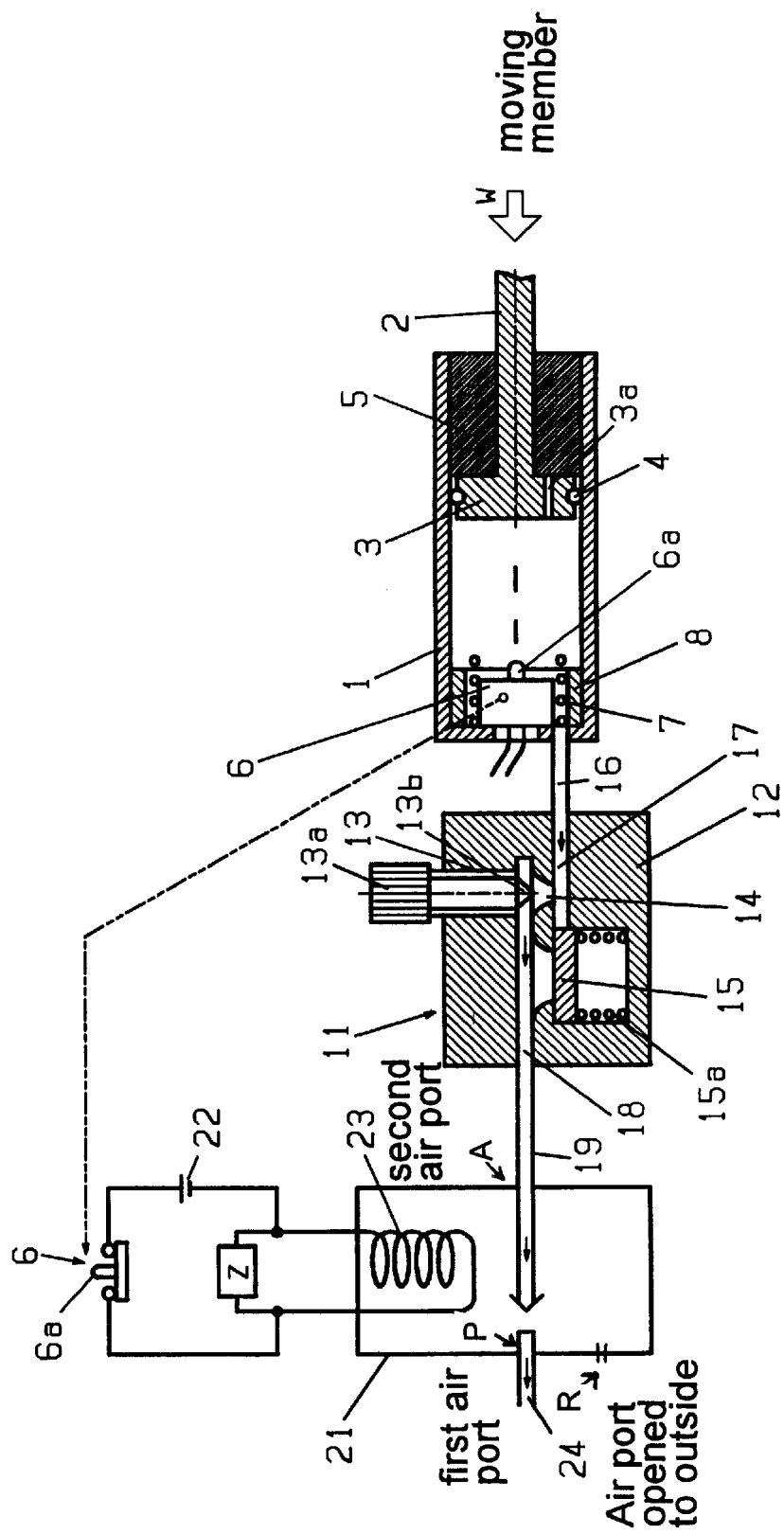
FIG. 1 is an explanatory diagram of a first embodiment of a shock absorber according to the invention showing a state where a piston pushed by a moving member is going to move.
Figure 2:
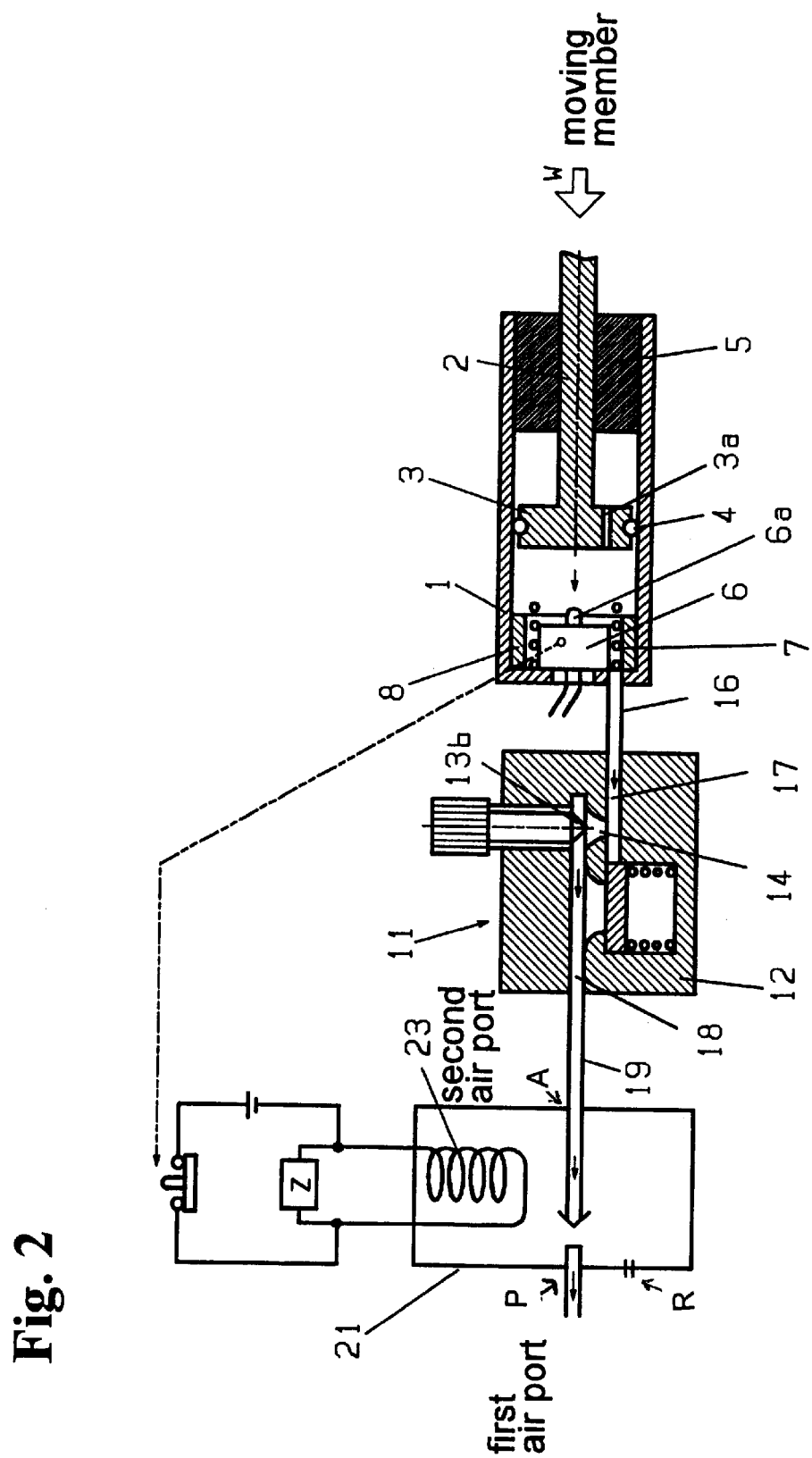
FIG. 2 is an explanatory diagram of the first embodiment showing a state where air in the cylinder is going to be compressed.
Figure 3:
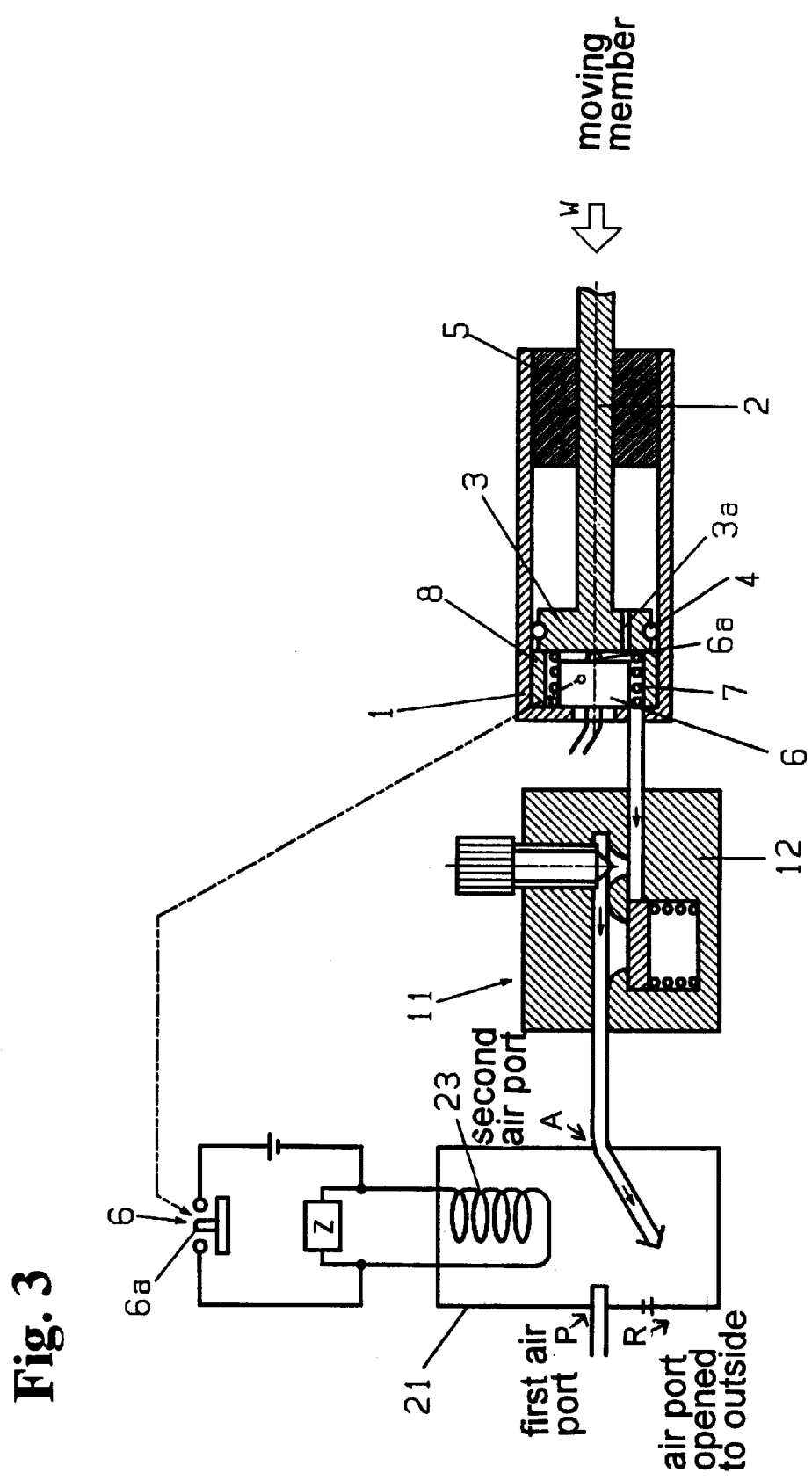
FIG. 3 is an explanatory diagram of the first embodiment showing a state where the piston reaches an inner end of the cylinder.
Figure 4:
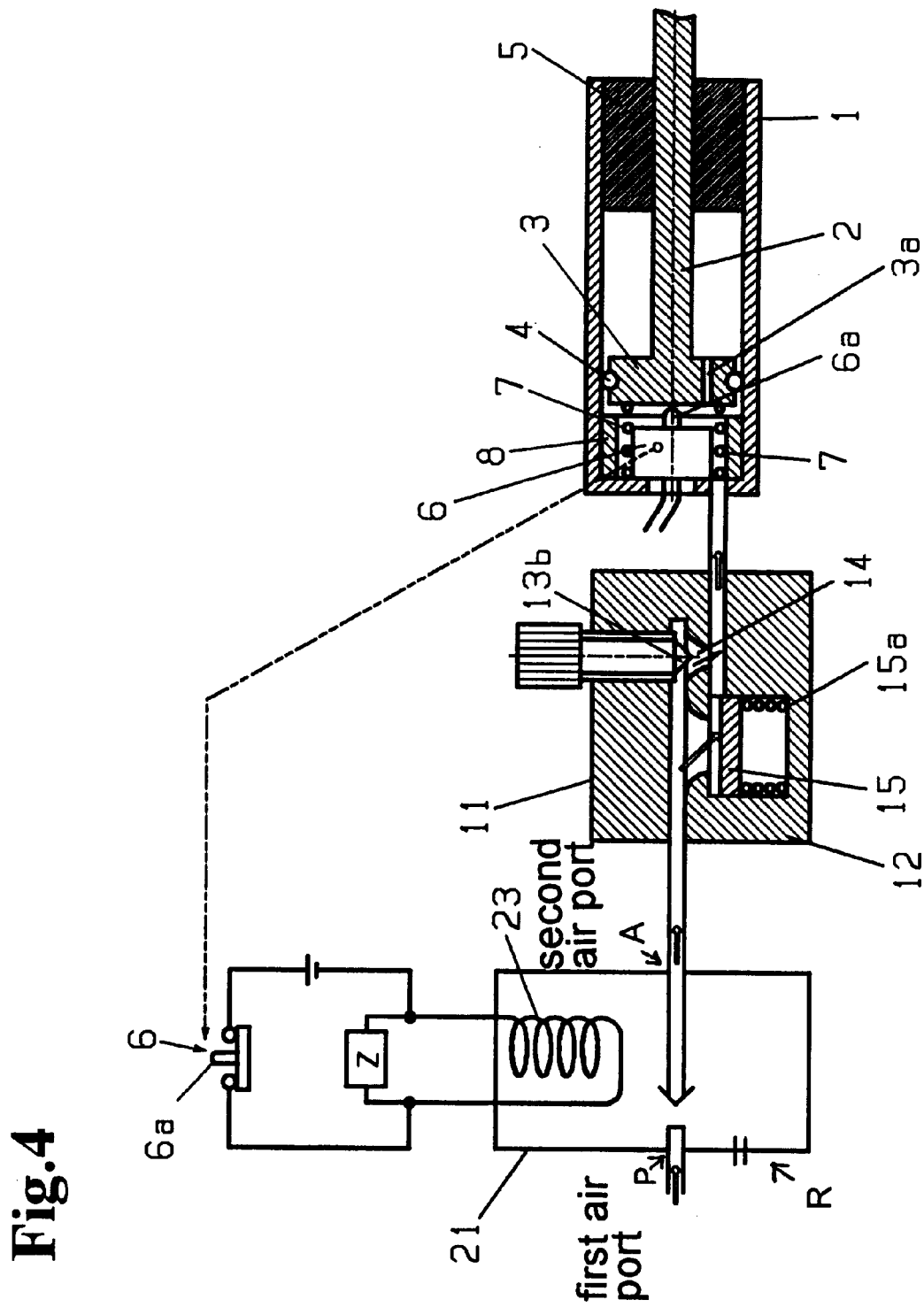
FIG. 4 is an explanatory diagram of the first embodiment showing a state where the piston is going to return to an original state.

FIGS. 1 to 4 are explanatory diagrams showing a structure of a first embodiment of a shock absorber according to the present invention, wherein FIG. 1 shows a state where a piston pushed by a moving member is going to move; FIG. 2 shows a state where the piston pushed by the moving member is compressing air in a cylinder; FIG. 3 shows a state where the piston contacts an inner end of the cylinder; and FIG. 4 shows a state where the piston is going to return to an original state as shown in FIG. 1.

In FIGS. 1 to 4, reference numeral 1 denotes a cylinder; 2 is a piston shaft; 3 is a piston; 3a is an air extracting hole provided in the piston; 4 is a piston ring for sealing the cylinder 1, provided around the piston 3; 5 is a bearing of the piston shaft 2 fixed to the cylinder 1 and having a center line along the center of the cylinder 1 as a bearing center; 6 is a pushing switch fixed to an inner end of the cylinder 1; 6a is an actuator of the pushing switch 6; 7 is a compression coil spring; and 8 is a piston stopper in a ring shape provided to contact an inner periphery of the cylinder 1.

In FIG. 1, reference numeral 11 represents a speed controller; 12 is a main portion of the speed controller; 13 is a controlling screw; 13a is a controlling portion; 13b is a flow quantity controlling shaft; and 14 is a flow quantity controlling shaft hole having substantially the same shape as that of a forward end portion of the flow quantity controlling shaft 13b. An air flow quantity can be controlled by adjusting a slit formed between the flow quantity controlling shaft 13b and the flow quantity shaft hole 14 by turning the controlling tongue 13a (first valve).

Reference numeral 15 is a check valve, i.e. second valve, and normally, is in close contact with a valve seat of the speed controller main portion 12 by being pushed upward in the drawing by a compression coil spring 15a. Numeral 16 is a third air tube for connecting a second air passage 17 formed inside the speed controller main portion 12, and an inside of the cylinder 1.

Reference numeral 22 on a left upper portion in FIG. 1 is a DC power source to which the pushing switch 6, same as that fixed to the inner end of the cylinder 1, and a solenoid 23 of an electromagnetic valve 21 are connected. Further, the DC power source 22 is connected, in parallel to the solenoid 23, to a controlling device Z for outputting a contact signal to indicate that the piston 3 pushed by the moving member W contacts the inner end of the cylinder 1.

Reference symbol P represents a first air port of the electromagnetic valve 21 connected to an end of a first tube 24 led from an air tank, not shown; and A is a second air port of the electromagnetic valve 21, and is connected to a first air passage 18 of the speed controller main portion 12 through a second tube 19.

Next, the operation of the shock absorber is explained. In FIG. 1, when the piston shaft 2 pushed toward a left side in the drawing by the moving member W is displaced toward the left side through sliding along the bearing 5, the piston 3 integrally provided to the piston shaft 2 compresses air inside the cylinder 1.

In this case, air flows into a back side of the piston 3 through the air extracting hole 3a not to become a vacuum state between a back side, i.e. a side of the bearing 5, of the piston 3 and the bearing 5.

As shown in FIG. 2, air compressed by the piston 3 passes through the third tube 16 and the second air passage 17, so that only a limited quantity of air determined by the slit formed by the flow quantity controlling shaft 13b and the flow quantity controlling shaft hole 14 flows in an arrow direction to reach the electromagnetic valve 21 through the first air passage 18 and the second air tube 19.

In FIG. 2, since a circuit of the pushing switch 6 is closed, the solenoid 23 of the electromagnetic valve 21 is energized. Also, the first air port P and the second air port A are connected. Thus, the compressed air flows from the second air port A to the first air port P to be returned to the air tank.

Next, as shown in FIG. 3, the piston 3 comes to contact the inner end of the cylinder 1, and right before a forward end of the piston 3 abuts against the piston stopper 8, a left end of the piston 3 allows the actuator 6a of the pushing switch 6 to displace to thereby turn off the pushing switch 6. Thus, the solenoid 23 of the electromagnetic valve 21 is switched off, so that the second air port A and an air port R opened to outside are connected, and the compressed air in the cylinder 1 is discharged outside to thereby allow the piston 3 to firmly contact.

At the same time, the contact signal for indicating that the piston 3 contacts the inner end of the cylinder 1 is outputted to a controlling device Z.

Next, as shown in FIG. 4, in case the pushing force against the piston shaft 2 by the moving member W is removed, the piston 3 is slightly moved to the right side, in the drawing, by a reactive force of the compression coil spring 7 with less stroke. Thus, the actuator 6a of the pushing switch 6 is restored to turn on the pushing switch 6.

Incidentally, in case a restoring force of the actuator 6a of the pushing switch 6 is large, the above-mentioned compression coil spring 7 is not required.

When the pushing switch 6 is turned on, an output of the contact signal of the controlling device Z is restored; at the same time, the solenoid 23 of the electromagnetic valve 21 is excited; and the second air port A is connected to the first air port P to thereby allow air to flow in an arrow direction.

In this case, compressed air opens the compression coil spring 15a of the check valve 15 against its pushing force, so that the air in a large quantity flows in a short time regardless of the air flow quantity determined by the slit formed by the flow controlling shaft 13b and the flow quantity controlling shaft hole 14. Thus, the piston 3 is quickly displaced to the right side and restored to the same state as shown in FIG. 1.

Figure 5:
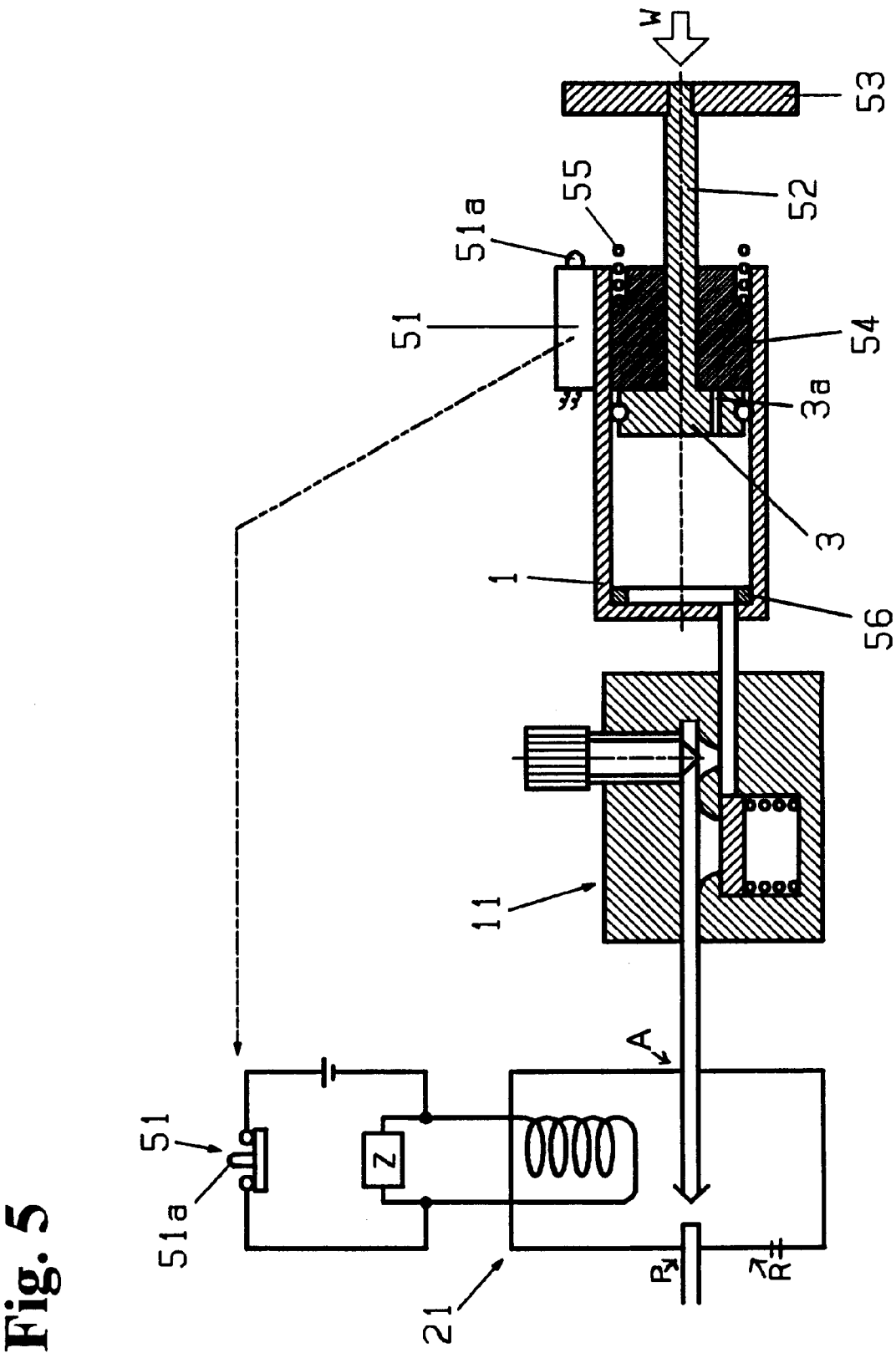
FIG. 5 is an explanatory diagram of a second embodiment of a shock absorber according to the invention showing a state where a piston pushed by a moving member is going to move.
Figure 6:
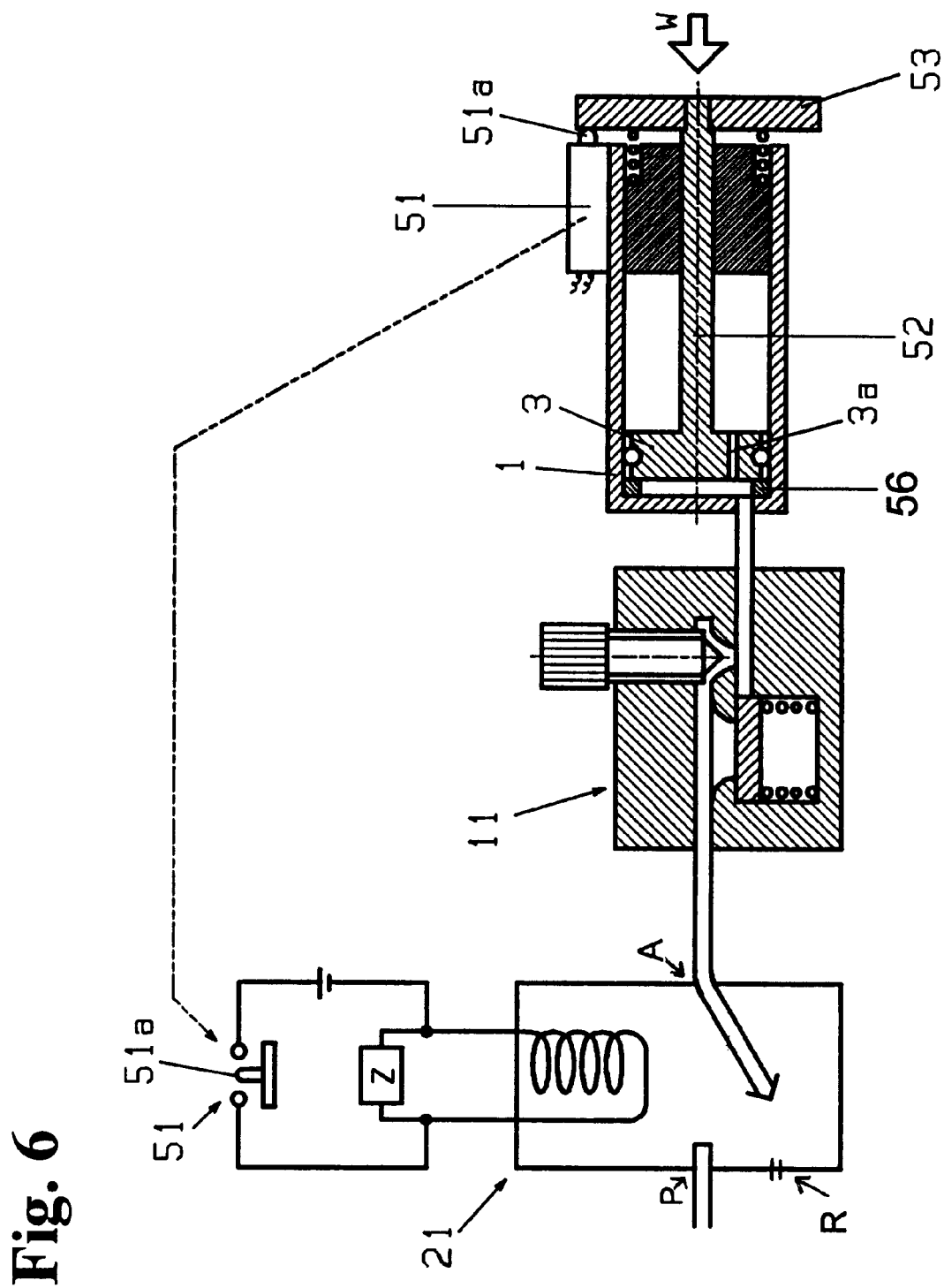
FIG. 6 is an explanatory diagram of the second embodiment showing a state where the piston reaches the inner end of a cylinder.

FIGS. 5 and 6 show a structure of a second embodiment according to the present invention. In the first embodiment, as shown in FIGS. 1 to 4, though the pushing switch 6 is fixed to the innermost position of the cylinder 1, in the second embodiment, as shown in FIGS. 5 and 6, the pushing switch is fixed on an outer side of the cylinder 1.

FIG. 5 corresponds to FIG. 1 except for a switching device, and FIG. 6 corresponds to FIG. 3 except for the switching device. In these drawings, the same parts or portions are denoted by the same reference numerals or symbols, and explanations therefor are omitted.

In FIG. 5, a pushing switch 51 is fixed to a right end of an outer wall of the cylinder 1, and an actuator 51a thereof faces an operating panel 53 fixed to a right end of the piston shaft 52. The pushing switch 51 provided at the upper left in FIG. 5 is the same as that attached to the cylinder 1, and is turned on under a condition of FIG. 5.

The piston shaft 52 is supported by the bearing 54; a compression coil spring 55 is inserted in a groove provided around an outer surface of the bearing 54; and a piston stopper 56 is provided at the inner end of the cylinder 1.

The compression coil spring 55 and the piston stopper 56 have the same functions as those of the compression coil spring 7 and the piston stopper 8 in FIG. 1.

Figure 7:
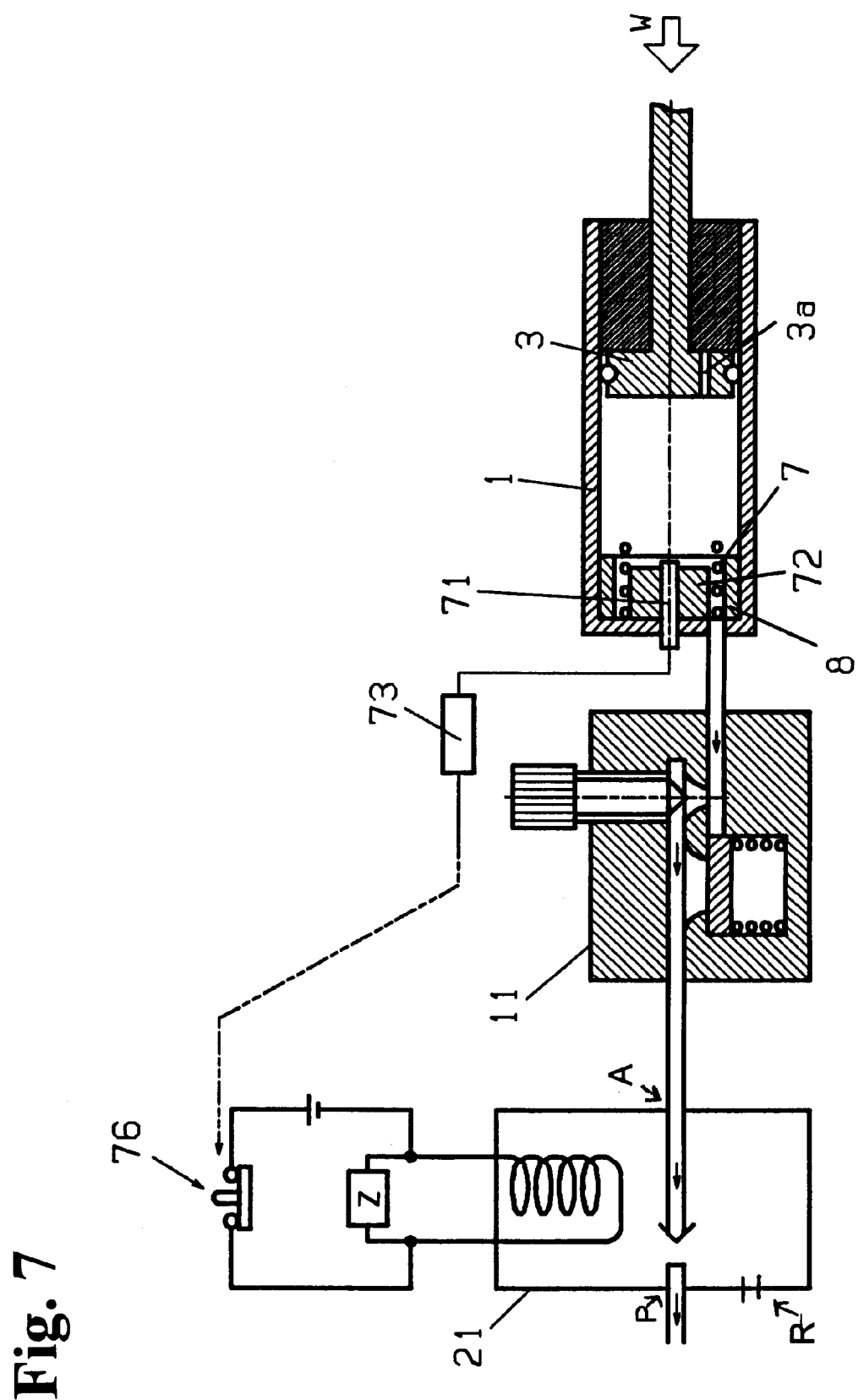
FIG. 7 is an explanatory diagram of a third embodiment of a shock absorber according to the present invention showing a state where the piston pushed by a moving member is going to move.
Figure 8:
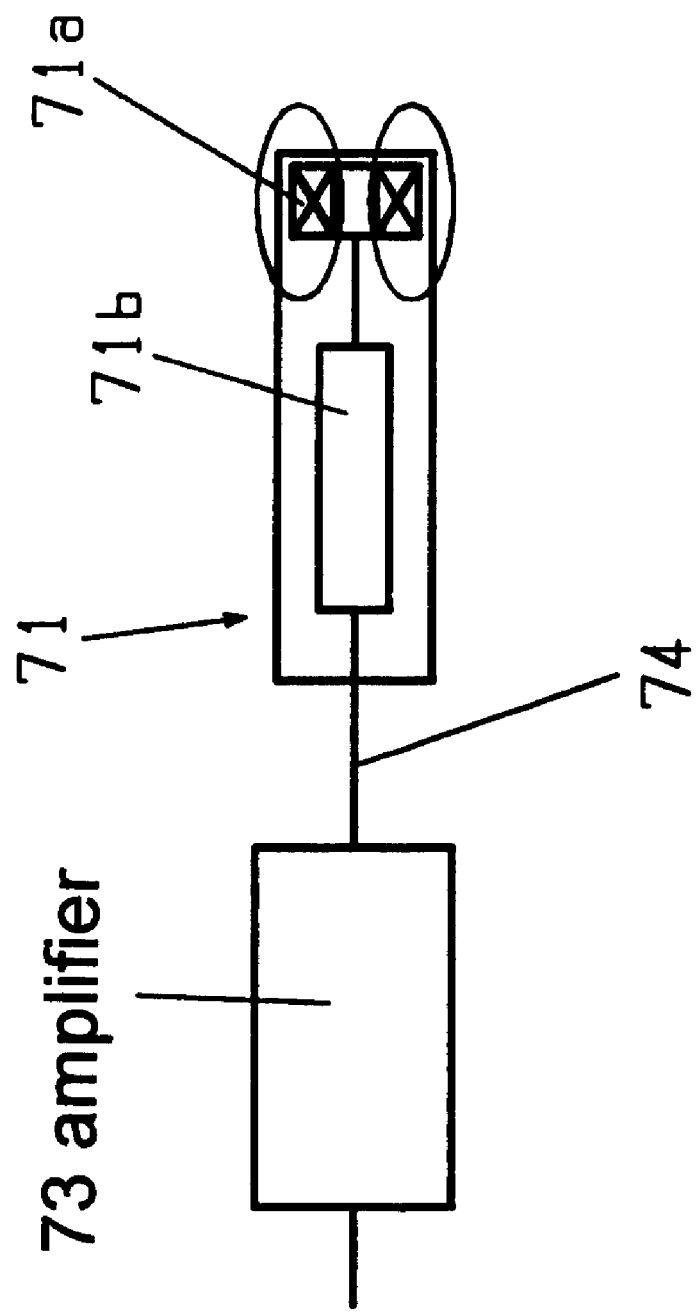
FIG. 8 is a diagram showing a proximity switch of the third embodiment.

Next, an operation of the shock absorber of the second embodiment is explained. The actuator 51a of the pushing switch 51 is pushed by a left end of the operating panel 53 right before the piston 3 abuts against the piston stopper 56 to thereby turn the pushing switch 51 off, as shown in FIGS. 5 and 6. Since the operation other than the above-mentioned portion is the same as that in FIGS. 1 to 4, explanation therefor is omitted. FIGS. 7 and 8 show a structure of a shock absorber according to a third embodiment, wherein a proximity switch is used as the switching device. FIG. 7 corresponds to FIG. 1 except for the switching device; the same parts and portions as those in FIG. 1 are denoted by the same reference numerals and symbols; and explanations thereof are omitted.

FIG. 8 shows the switching device in detail, wherein the proximity switch includes a proximity sensor 71, an amplifier 73 and a lead wire 74 for connecting the proximity sensor 71 and the amplifier 73. Incidentally, reference numeral 76 represents an output from the amplifier 73 expressed as a pushing switch.

In FIG. 7, a holding plate 72 of the proximity sensor 71 is provided at the inner end of the cylinder 1 to fix the proximity sensor 71 thereto. In this case, the proximity sensor 71 is fixed to the holding plate 72, so that the proximity sensor 71 operates right before the piston 3 abuts against the piston stopper 8.

Next, an operation of the shock absorber of the third embodiment is explained. The proximity sensor 71 is provided to start operation right before the piston 3 abuts against the piston stopper 8, as described above. In a state shown in FIG. 7, a detecting coil 71a (FIG. 8) magnetized by high-frequency exhibits no change, and the output of the amplifier 73 is in the same state as in an on-state of the pushing switch 6 in FIG. 1.

Since an operation thereafter is the same as those in FIGS. 3 and 4 except for the switching device, the explanation is made with reference to FIGS. 3 and 4.

When the piston 3 approaches the inner end of the cylinder 1, right before it abuts against the piston stopper 8 (corresponding to FIG. 3), the piston 3 made of a material, such as iron, allows an impedance of the detecting coil 71a magnetized by the high-frequency to change, and the change is supplied to the amplifier 73 through the detecting circuit 71b.

The output of the amplifier 73, at that time, becomes the same state as the off-state of the pushing switch 6 in FIG. 3. Thus, air compressed by the cylinder is discharged to outside, and at the same time, the contact signal is outputted to the controlling device Z.

Next, as corresponding to FIG. 4, in case a pressing force to the piston shaft 2 by the moving member W is removed, since the piston 3 is moved in the right side in the drawing by the compression coil spring 7, the detecting coil 71a exhibits no change, and an output of the amplifier 53 becomes the same state as the on-state of the pushing switch 6 in FIG. 4. In other words, the piston 3 is restored by a force of air, and at the same time, the contact signal of the controlling device Z is restored.

Figure 9A:
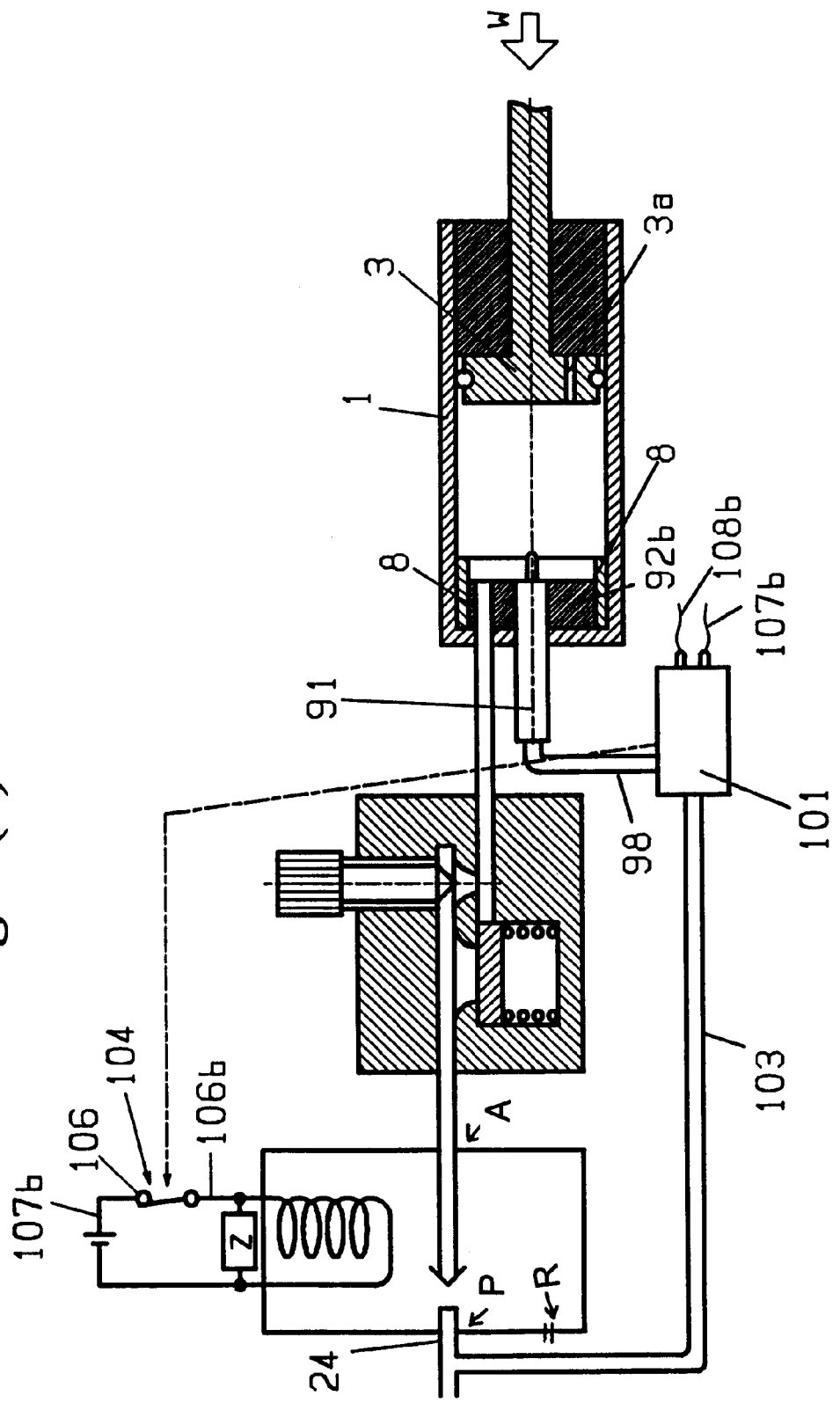
FIG. 9(a) is an explanatory diagram of a fourth embodiment of a shock absorber according to the invention showing a state where a piston pushed by a moving member is going to move.
Figure 9B:
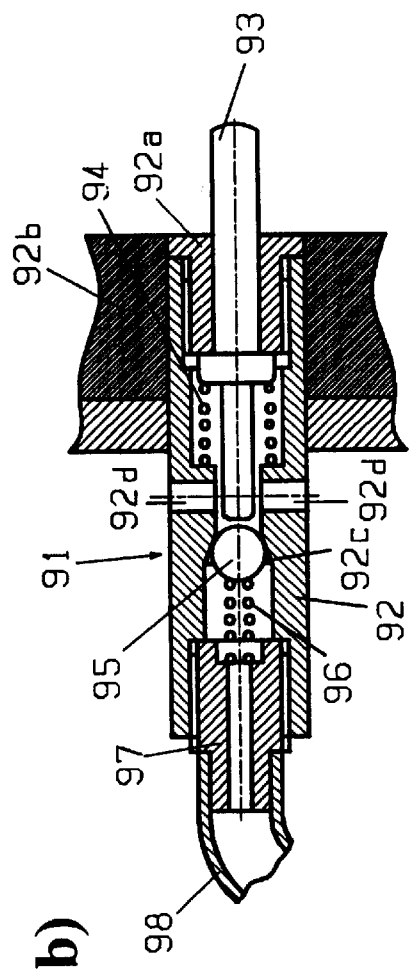
FIG. 9(b) is a sectional view of an air actuator of the fourth embodiment.
Figure 9C:
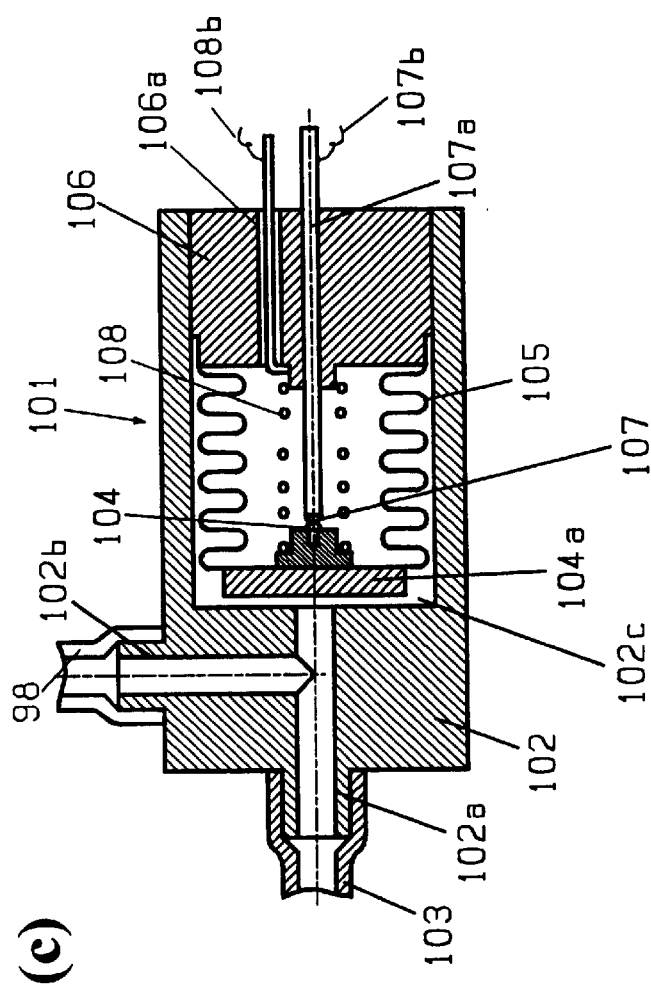
FIG. 9(c) is a sectional view of an air switch of the fourth embodiment.
Figure 10A:
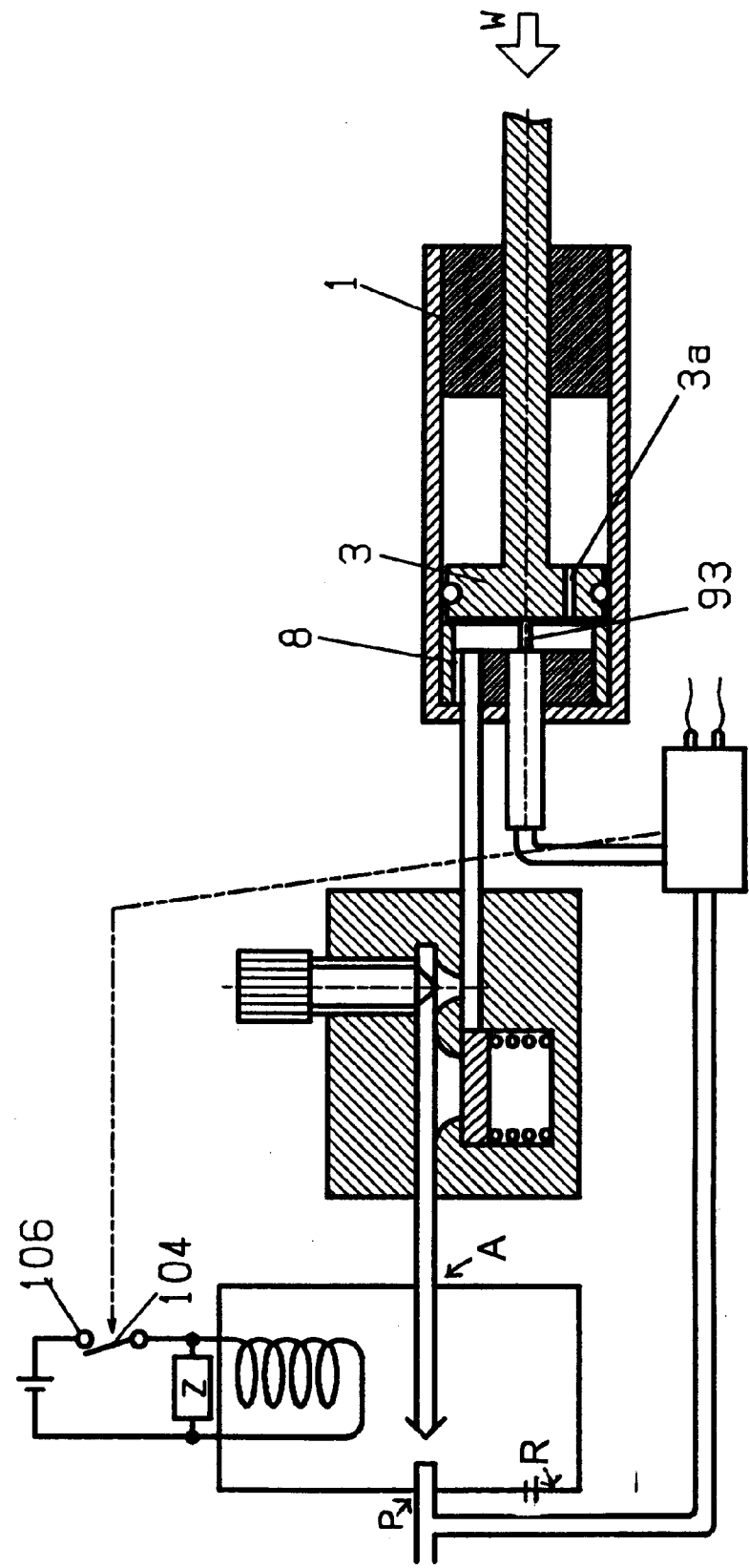
FIG. 10(a) is an explanatory diagram of the fourth embodiment showing a state where the piston contacts an inner end of a cylinder.
Figure 10B:
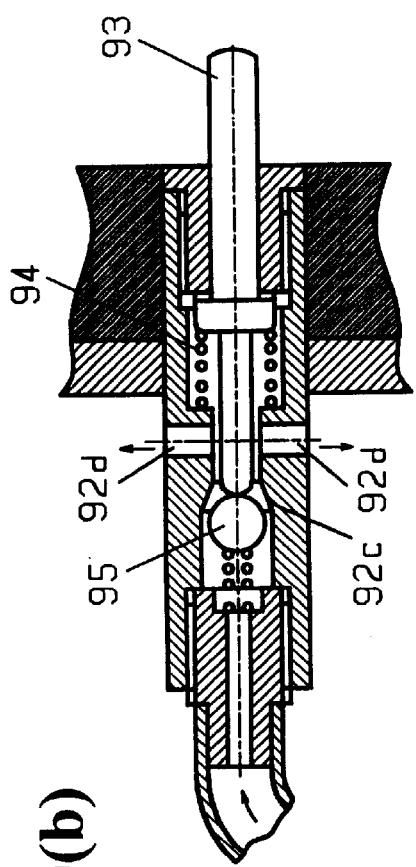
FIG. 10(b) is a sectional view of the air actuator.
Figure 10C:
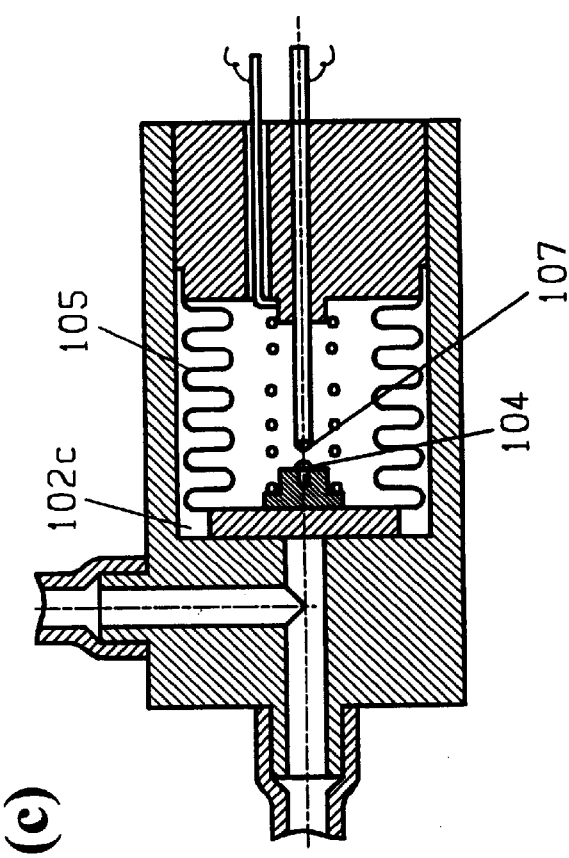
FIG. 10(c) is a sectional view of the air switch.

FIGS. 9(a) to 10(c) are diagrams showing a structure of a shock absorber according to a fourth embodiment using an air switch as the switching device, wherein FIG. 9(a) shows a state where the piston pushed by the moving member is going to move (corresponding to FIG. 1); FIG. 10(a) shows a state where the piston reaches the inner end of the cylinder (corresponding to FIG. 3); FIGS. 9(b) and 10(b) are sectional views of an air actuator, respectively; and FIGS. 9(c) and 10(c) are sectional views of the air switch, respectively.

The same reference symbols as those in FIGS. 1 to 4 are applied to the same parts and portions except for the air switch, and the explanations therefor are omitted.

FIG. 9(b), reference numeral 91 denotes an air actuator, 92 is an air actuator main portion; 92a is a bearing for a contact member, screwed to the air actuator main portion 92; 92b is an air actuator seat for fixing the air actuator main portion 92 to the cylinder 1; 93 is a contact member slidably inserted into the bearing for the contact member 92a; 94 is a compression coil spring for always pressing the contact member to the right side; 95 is a ball-shape valve; 96 is a compression coil spring for always pressing the valve 95 to the right side; 92c is a valve seat for the valve 95; 92d is an air opening radially provided at a center of the air actuator main portion 92; 97 is an air input terminal; and 98 is an air tube fixed to a left end of the air input terminal.

In FIG. 9(c), reference numeral 101 represents an air switch; 102 is an air switch main portion; 102a is an air input terminal disposed to the air switch main portion 102, and is connected to a tube 103 branched from the first tube 24 (in FIG. 1) led from the air tank, not shown; 102b is an air output terminal disposed at the air switch main portion 102, and is connected to the air tube 98 led to the air actuator 91.

A bellows chamber 102c is provided in the air switch main portion 102, and bellows 105 is provided with a movable contact plate 104a, at its forward end, to which a movable contact point 104 is fixed, and is firmly fixed to a receiving plate 106 having an insulating ability. The receiving plate 106 is inserted into a right end of the bellows chamber 102c under the pressure.

A fixed contact point shaft 107a having a fixed contact point 107 at its forward end and facing the movable contact point 104 is attached to the receiving plate 106, and a lead wire 107b is fixed outside the receiving plate 106 of the fixed contact point shaft 107a.

Numeral 108 is a compression coil spring for allowing the movable contact point 104 to be always separated from the fixed contact point 107, and one end thereof projects to an outside through a hole 106a serving also as an air extractor of the receiving plate 106, to which a lead wire 108b is fixed.

Next, an operation of the structure of the fourth embodiment as described above is explained.

In FIGS. 9(a)–9(c), since the valve 95 is closely attached to the valve seat 92b by the pressing force of the compression coil spring 96 and a pressure of a compressed air sent from the air tank through tubes 103 and 98 is not lowered, the bellows 105 is pushed to the right side in the drawing and the movable contact point 104 contacts the fixed contact point 107. Thus, a circuit including the lead wire 107b, fixed contact point 107, movable contact point 104, compression coil spring 108 and lead wire 108b is closed. In other words, the same state as that shown in FIG. 1 where the pushing switch 6 is turned on, can be held.

In case the piston 3 is pressed by the moving member W in FIG. 9(a) to thereby move to the left side, the piston 3 becomes a state as shown in FIGS. 10(a)–10(c).

In FIG. 10(a), the contact member 93 is pressed by the forward end of the piston 3 right before the forward end of the piston 3 abuts against the piston stopper 8, to thereby displace to the left side in the drawing and push the valve 95 to the left side. Thus, the compressed air passes through the valve 95 and is discharged through the hole 92d to the outside. Accordingly, an air pressure in the bellows chamber 102c is lowered to expand the bellows 105 and to separate the movable contact point 104 from the fixed contact point 107.

In other words, the same state as that shown in FIG. 3 where the pushing switch 6 is turned off can be held. The compressed air in the cylinder 1 is discharged to the outside, and at the same time, the contact signal is outputted to the controlling device Z.

Further, in case the pressing force to the piston shaft 2 by the moving member W is removed from the state of FIG. 10(a), which corresponds to the state of FIG. 4, the contact member 93 is pressed by the compression coil spring 94 to move the piston 3 in the right side in the drawing and the valve 75 is again pressed against the valve seat 72c to thereby raise the air pressure in the bellows chamber 102c. Thus, the bellows 105 is pressed to allow the movable contact point 104 to contact the fixed contact point 107, which corresponds to the sate of FIG. 4. Thus, a large quantity of air is sent to the cylinder 1, so that the piston 3 is returned to the state of FIG. 9(a) in the cylinder, and at the same time, the contact signal controlling device Z is also restored.

Hereinabove, it has been explained that the switching devices 6, 51, 76 and 106 are held in an on-state until right before the forward end of the piston 3 abuts against the inner end of the cylinder 1, and when the forward end of the piston 3 abuts against the inner end of the cylinder 1, the switching devices become an off-state, respectively. However, of course, these switching devices may be held in the off-state until right before the forward end of the piston 3 abuts against the inner end of the cylinder 1, and when the forward end of the piston 3 abuts against the inner end of the cylinder 1, the switching devices may become the onstate, respectively.

In this case, when the solenoid 23 is not energized, the first air port P is connected to the second air port A, and when the solenoid 23 is energized, the second air port A is connected to the air port R opened outside.

In the same manner, the present invention is not limited to the above-described embodiments, and can be modified unless the subject deviates from the scope of the invention.

Since the shock absorber of the present invention is provided with the switching device, the piston can be restored by the air force without receiving any controlling signal from an outside, to thereby omit a large restoring spring, and the moving member can firmly contact the inner end with less propulsion. Thus, a shock absorber with less defects can be obtained.

Also, in the shock absorber of the present invention, since the switching device is provided, when the forward end of the piston pushed by the moving member reaches the inner end of the cylinder, the compressed air in the inner portion of the cylinder is ejected, so that the forward end of the piston can firmly contact the stopping surface.

Further, in the shock absorber of the present invention, since the switching device is provided, the signal indicating that the piston reaches the inner end of the cylinder can be outputted to the control circuit of the moving member.

While the invention has been explained with reference to the specific embodiments of the invention, the explanation is illustrative and the invention is limited only by the appended claims.

What is claimed is:

1. A shock absorber comprising:
    a cylinder having a stopping surface,
    a piston slidably situated in the cylinder, said piston being moved when it is pushed by a moving member,
    a switching device attached to the cylinder to be actuated right before the piston abuts against the stopping surface of the cylinder,
    an electromagnetic valve connected to the switching device and having a first position and a second position for allowing air in the cylinder to escape outwardly when the piston is moved and the electromagnetic valve is operated by the switching device, and
    a spring situated near the piston to allow the switching device to operate in association with a movement of the piston, said spring, when a pressing force applied to the piston is removed after the switching device is actuated, urging the piston in a direction away from the switching device to allow the switching device to return to an original position before the switching device was actuated.

2. A shock absorber according to claim 1, further comprising means for providing compressed air connected to the electromagnetic valve, said means for providing compressed air communicating with the cylinder in the first position so that when the electromagnetic valve is switched from the second position to the first position, compressed air is fed into the cylinder to thereby allow the piston to return to a state before air in the cylinder is compressed.

3. A shock absorber according to claim 2, further comprising a speed controller situated between the cylinder and the electromagnetic valve and having a first valve communicating with an inside of the cylinder, said first valve being adjustable to control an air quantity ejected from the inside of the cylinder in case air in the cylinder is compressed by the piston and is ejected therefrom, and a second valve for quickly feeding a large quantity of air into the cylinder in case air is fed into the cylinder from the means for providing compressed air and the electromagnetic valve is in the first position.

4. A shock absorber according to claim 3, wherein said switching device includes an air actuator attached to the cylinder, and an air switch connected to the means for providing the compressed air and the air actuator and operated by the air actuator, said electromagnetic valve being connected to the air switch and operated by the air actuator.

5. A shock absorber according to claim 4, wherein said air actuator includes an actuator body, a contact member slidably situated in the actuator body and operated by the piston, and an actuator valve situated inside the actuator body and opened by the contact member when the contact member is operated by the piston.

6. A shock absorber according to claim 5, wherein said air switch includes a chamber communicating with the means for providing the compressed air and the air actuator, and a pressure switch situated in the chamber and actuated by a pressure in the chamber.

7. A shock absorber according to claim 4, wherein said spring is located in the air actuator.

8. A shock absorber according to claim 3, wherein said switching device is situated inside the cylinder.

9. A shock absorber according to claim 3, wherein said switching device is attached to an outside the cylinder to be operated by an operating plate of the piston.

10. A shock absorber according to claim 2, further comprising a bearing fixed inside the cylinder, said piston having a shaft slidably supported by the bearing.

11. A shock absorber according to claim 10, wherein said spring is located on and supported by the bearing.

12. A shock absorber according to claim 2, wherein said witching device outputs a contact signal for indicating that a forward end of the piston pressed by the moving member contacts the stopping surface of the cylinder through an operation of the switching device.

13. A shock absorber according to claim 1, wherein said switching device is situated inside the cylinder, and said spring is located inside the cylinder outside the switching device.

* * * * *